United States Patent
Wendt

(10) Patent No.: US 9,195,119 B2
(45) Date of Patent: Nov. 24, 2015

(54) PERSONAL CAMERA ACCESSORY SYSTEM

(71) Applicant: GeckoGear LLC, Maricopa, AZ (US)

(72) Inventor: Peter M. Wendt, Evergreen, CO (US)

(73) Assignee: GeckoGear LLC, Maricopa, AZ (US)

( * ) Notice: Subject to any disclaimer, the term of this patent is extended or adjusted under 35 U.S.C. 154(b) by 0 days.

(21) Appl. No.: 14/264,785

(22) Filed: Apr. 29, 2014

(65) Prior Publication Data

US 2015/0309392 A1    Oct. 29, 2015

(51) Int. Cl.
| | |
|---|---|
| *G03B 17/02* | (2006.01) |
| *G03B 17/14* | (2006.01) |
| *G03B 17/56* | (2006.01) |
| *G03B 17/12* | (2006.01) |

(52) U.S. Cl.
CPC ............. *G03B 17/14* (2013.01); *G03B 17/12* (2013.01); *G03B 17/568* (2013.01)

(58) Field of Classification Search
USPC ........ 396/25–29, 422, 427, 535, 544; 348/81, 348/373–376; 455/575.1
See application file for complete search history.

(56) References Cited

U.S. PATENT DOCUMENTS

| | | | | |
|---|---|---|---|---|
| 4,591,250 | A  * | 5/1986 | Woodruff | 396/50 |
| 7,060,921 | B2 * | 6/2006 | Kubo | 200/302.1 |
| 8,678,677 | B2 * | 3/2014 | Jensen | 396/419 |
| 2013/0315577 | A1 * | 11/2013 | Clark et al. | 396/27 |
| 2014/0226062 | A1 * | 8/2014 | Parrill | 348/376 |

* cited by examiner

*Primary Examiner* — Minh Phan
(74) *Attorney, Agent, or Firm* — Boyle Fredrickson, S.C.

(57) ABSTRACT

A case or support accessory system for a camera device, such a photo or video personal camera, that includes a base constructed to removably cooperate with the camera device. In a preferred embodiment, the case system generally encloses the camera device without interfering with operation of one or more of the control features associated with operation of the camera device. The base includes a plurality of mount arrangements that are each shaped to selectively removably cooperate with one of a plurality of mount adapters. The mount, adapters are constructed to magnetically or physically interact with a variety of accessories that support or augment operation, such as via a flash or light device, associated with hands-free use of the camera device.

12 Claims, 18 Drawing Sheets

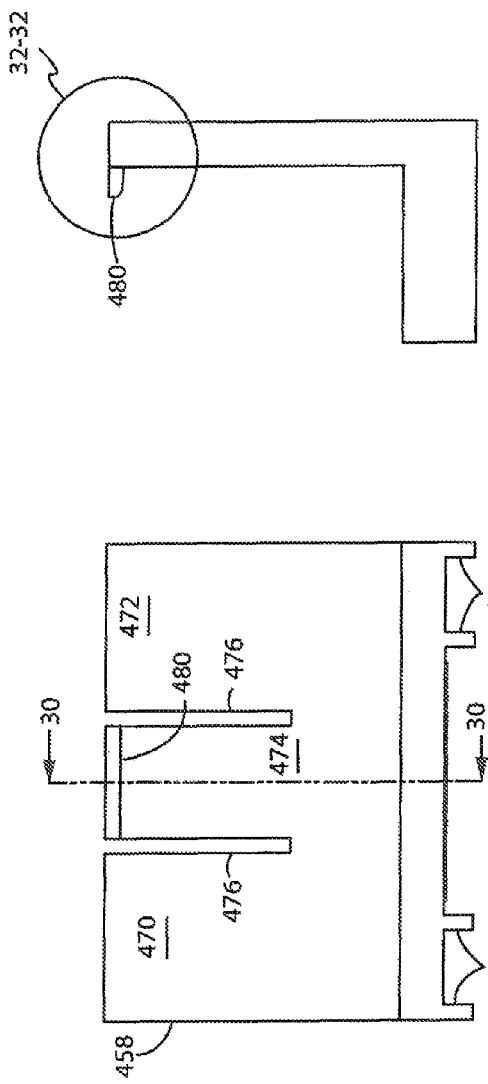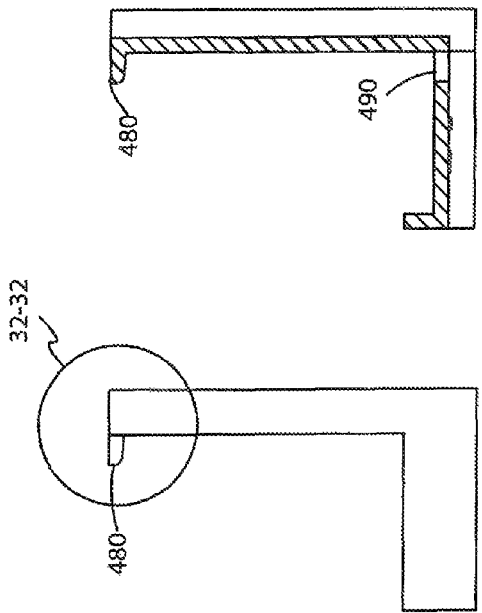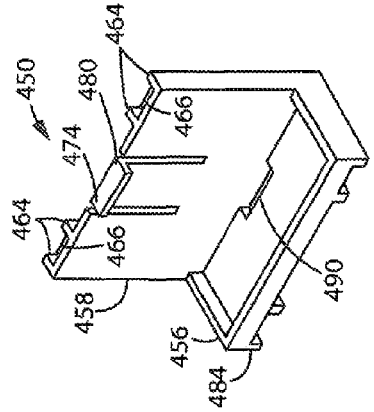

PERSONAL CAMERA ACCESSORY SYSTEM

FIELD OF THE INVENTION

The present invention relates generally to personal cameras, and more particularly, to an accessory system constructed to removably cooperate with what are considered generally environment proof camera and video camera devices. In a preferred aspect, the accessory system provides a selectively removable interaction between a case constructed to contain the camera device and supplemental support and connection devices and does so in a manner that does not interfere with utilization of controls associated with the underlying camera device.

BACKGROUND OF THE INVENTION

The use of portable electronic devices, and the capabilities of such devices, has proliferated recent years. Although many such devices have fairly robust constructions, some such devices remain susceptible to damage or inoperability due to being dropped, being exposed to moisture, etc. Further, the qualities of video and photographic materials that can be captured with such devices remain insufficient to satisfy the desires of various users. Even further, being generally compact in nature and formed of fairly smooth materials, such devices are commonly ill-suited or wholly impractical for use to particular environments and/or conditions where hands-free operation of the camera device is desired. Still further, many such devices are provided with limited connectivity or network accessibility to conveniently remove or export the media from the camera device to other devices or networks.

Recognizing one or more of the shortcomings discussed above, various others provide photographic and video camera devices that are constructed to better withstand. environmental conditions, capture higher quality photo and video data, and are more conveniently configured to extract recorded media from the camera device to other networks and/or devices. GoPro® camera and video devices are one such platform configured to capture extreme action video and photographic media and are provided in a lightweight, rugged, wearable, or mountable camera device configuration. The class of such devices are commonly termed "action cams" in as much as such devices can capture sound, image, and video data in a hands-free manner during respective activities, be it biking, running, motocross, water sports, skydiving, skiing, snowmobiling, road sports, etc. Although such devices capture image and video data that surpasses the quality attained with most other hand-held portable devices, there is still room for improvement in facilitating the use of such devices.

Customarily, such camera devices are captured or cooperate with a mount or other such structure that is secured to an underlying structure such as a vehicle, a helmet, a chest-plate, etc. Most such mounting arrangements require permanently attaching the underlying mount to the respective support structure. Such mounting commonly mares the structure of the support structure and limits the ability of the user to use the respective camera device and/or mount with other vehicles or the like. Modifying the underlying support structure to accommodate the mount also detracts from the value associated with a user's desire to upgrade or change in equipment. That is, subsequent purchasers without similar mount and/or camera device arrangements would be disinclined to pay the same value for similar products where one product includes evidence of a previous mounting of a camera device or a mount that is not otherwise already owned or included in the transaction.

Many such mounting devices are also uniquely configured to cooperate with a specific camera device and/or to provide a desired orientation of the camera device relative to a particular underlying vehicle and/or use. Such constructions require users to acquire multiple mount devices wherein each mount device is associates with a respective vehicle or intended use of a corresponding camera device. Still further, many such mount devices are commonly configured for cooperation with only one or a limited number of different models of camera devices. Should a given camera device be rendered inoperable, or should a user desire to upgrade an already owned camera device, it is more likely than not that already owned mounting devices will not suitably cooperate with a subsequently purchased camera device. Accordingly, the consumer must be cognizant of the cost associated with the purchase of the camera device as well as whether a desired replacement camera device will cooperate with already owned mount devices or the cost associated with replacement of already owned mount devices when upgrading or replacing already owned camera or video equipment.

Still a further consideration to camera device and mount arrangement cooperation is directed to maintaining a desired orientation of the camera device during use of an underlying vehicle. For instance various camera device cases and mounts are provided wherein the mount is oriented generally above, below, or to the side of the respective camera device. The mount device is commonly constructed to be secured to the underlying vehicle so that the camera device is oriented relative to the vehicle and the mount to attain generally "upright" data capture. That is, many such mount arrangements, although commonly somewhat adjustable, provide only a single orientation associated with cooperation of the mount arrangement relative to the underlying camera device.

Therefore, there is a need for a camera case system that does not interfere with user interaction with one or more of the controls of the underlying camera device, includes a plurality of mount arrangements that accommodate different orientations of the camera device relative to a mount, and includes a plurality of mount adapters that cooperate with camera accessories and/or are configured to cooperate with a mount surface in a variety of modalities.

BRIEF DESCRIPTION OF THE INVENTION

The present invention discloses a camera case system configured to overcome one or more of the shortcomings discussed above. One aspect of the invention discloses a case or support system for a camera device such a personal photo or video camera. The case system includes a base that is constructed to removably cooperate with a camera device. In a preferred embodiment, the case system generally encloses the camera device without interfering with operation of one or more of the control features associated with operation of the camera device. The base includes a plurality of mount arrangements that are each shaped to selectively removably cooperate with one of a plurality of mount adapters. The mount adapters are constructed to magnetically or physically interact with a variety of accessories that support or augment, such as via a flash or light device, associated with hands-free operation of the camera device.

Another aspect of the invention that is usable with one or more of the features of the above aspect discloses a camera accessory system that includes an enclosure that is defined by a body and a cover. The enclosure defines a cavity that is shaped to receive a camera device and the cover is movably connected to the body to allow access to the cavity such that the camera device can be inserted or removed from the cavity when the cover is in an open position relative to the body. At least one opening is formed through the enclosure and is positioned to overlie an interface associated with user interaction with the camera device. The system includes first and second mount arrangements and an accessory mount. The first and second mount arrangements are defined by an exterior surface of the enclosure and the first mount arrangement is associated with a first side of the enclosure and the second mount arrangement is associated with a second side of the enclosure. The accessory mount slidably cooperates with each of the first mount arrangement and the second mount arrangement such that the orientation of the accessory mount relative to the enclosure can be manipulated.

A further aspect of the invention that is usable with one or more of the above aspects discloses a camera case system that includes a body that is defined by a first portion and a second portion that is oriented in a crossing direction relative to the first portion. A rib extends about a perimeter of the first portion in a direction similar to the second portion and extends a distance that is shorter than the second portion of the body such that a camera device can be snuggly disposed within a boundary defined by the first portion, the second portion and the rib. A catch is supported by the second portion and offset from the first portion and the rib. The catch is deflectable relative to the second portion and includes a barb that is formed at an end of the catch that is offset from the first portion. The barb extends over a footprint defined by an area of the first portion bounded by the rib. The barb is positioned relative to the catch such that the barb slidably cooperates with a surface of the camera device that is opposite a surface of the camera device adjacent the first portion such that the camera is captured on respective sides by the first portion and second portion of the body, the rib, and the barb.

Another aspect of the invention that is usable with one or more of the above aspects discloses a method of forming a camera case system. The method includes providing a base that removably cooperates with a camera device and which cooperates with the camera device without interfering with user interaction with at least one of the controls associated with operation of the camera device. A plurality of mount arrangements are formed on an exterior surface of the base and a mount adapter is provided that removably cooperates with each of the mount arrangements.

These and other aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 28 is a front elevation view of the camera accessory system shown in FIG. 27;

FIG. 29 is a side elevation view of the camera accessory system shown in FIG. 28;

FIG. 30 is a cross-section view along line 30-30 of the camera accessory system shown in FIG. 28;

FIG. 31 is a bottom plan view of the camera accessory system shown in FIG. 27;

FIG. 32 is an elevation detail view along line 32 shown in FIG. 29 of the camera accessory system shown in FIG. 27;

FIG. 33 is a front right perspective view of the camera accessory system shown in FIG. 27;

Figure 1:
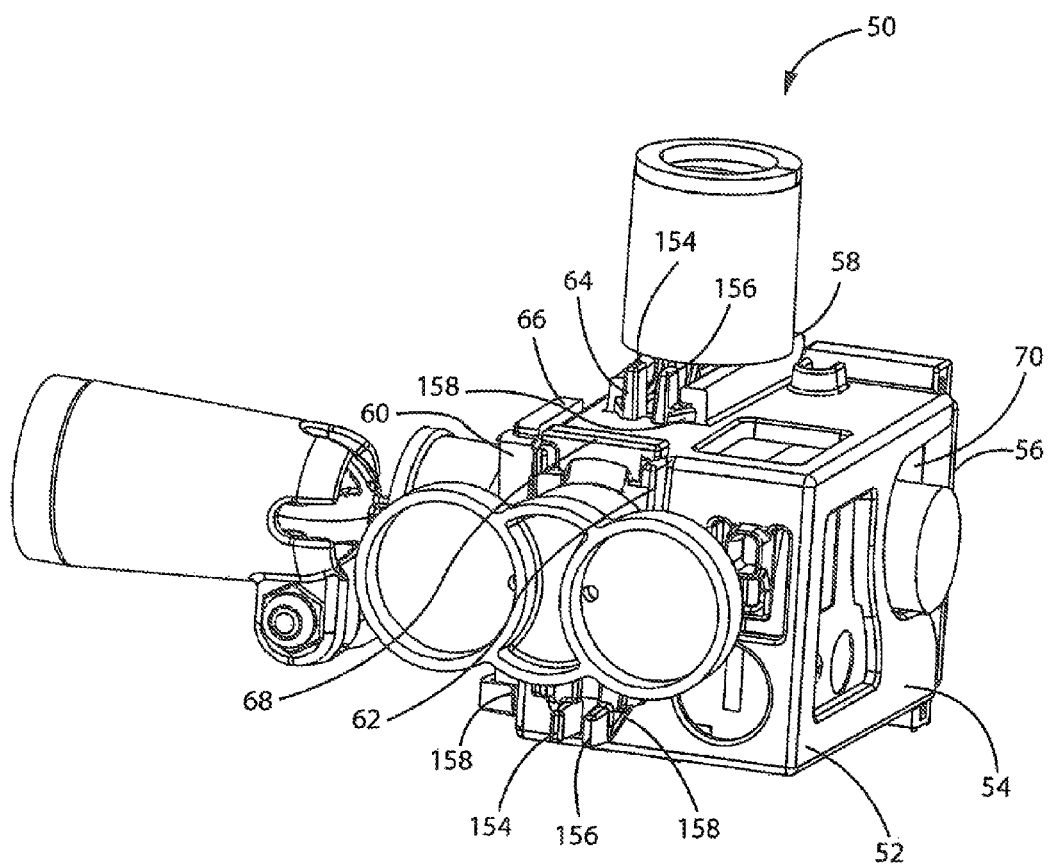
FIG. 1 is a left front perspective view of a camera accessory system according to one embodiment of the invention.

In describing the various embodiments of the invention, which is illustrated in the drawings, specific terminology will be referred to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF THE PREFERRED EMBODIMENT

The present invention and the various features and advantageous details thereof are explained more fully with reference to the non-limiting embodiments described in detail in the following description. As used herein, the term "camera" includes those devices that capture only photographic data, only video graphic data, and combinations thereof, i.e. devices that can concurrently or selectively capture both photographic and video data.

FIGS. 1-10 show various views of a camera case or camera accessory system 50, or simply accessory system 50, according to one embodiment of the present invention. Accessory system 50 includes a base or enclosure 52 that is defined by a base or body 54 and a lid or cover 56 that removably cooperates with body 54. Body 54 includes one or more mounting arrangements 58, 60, 62 that are each constructed to cooperate with a respective accessory mount or mount adapter 64, 66, 68. As explained further below, each respective accessory mount 64, 66, 68 is associated with providing various modalities for supporting enclosure 52, and a camera device or simply camera 70 associated therewith, relative to various support structures and/or other support devices such as boom handles or the like, or are configured to provide a mountable cooperation for other accessories, such as a level vial or a light source, associated with a desired use of the underlying camera device.

Figure 2:
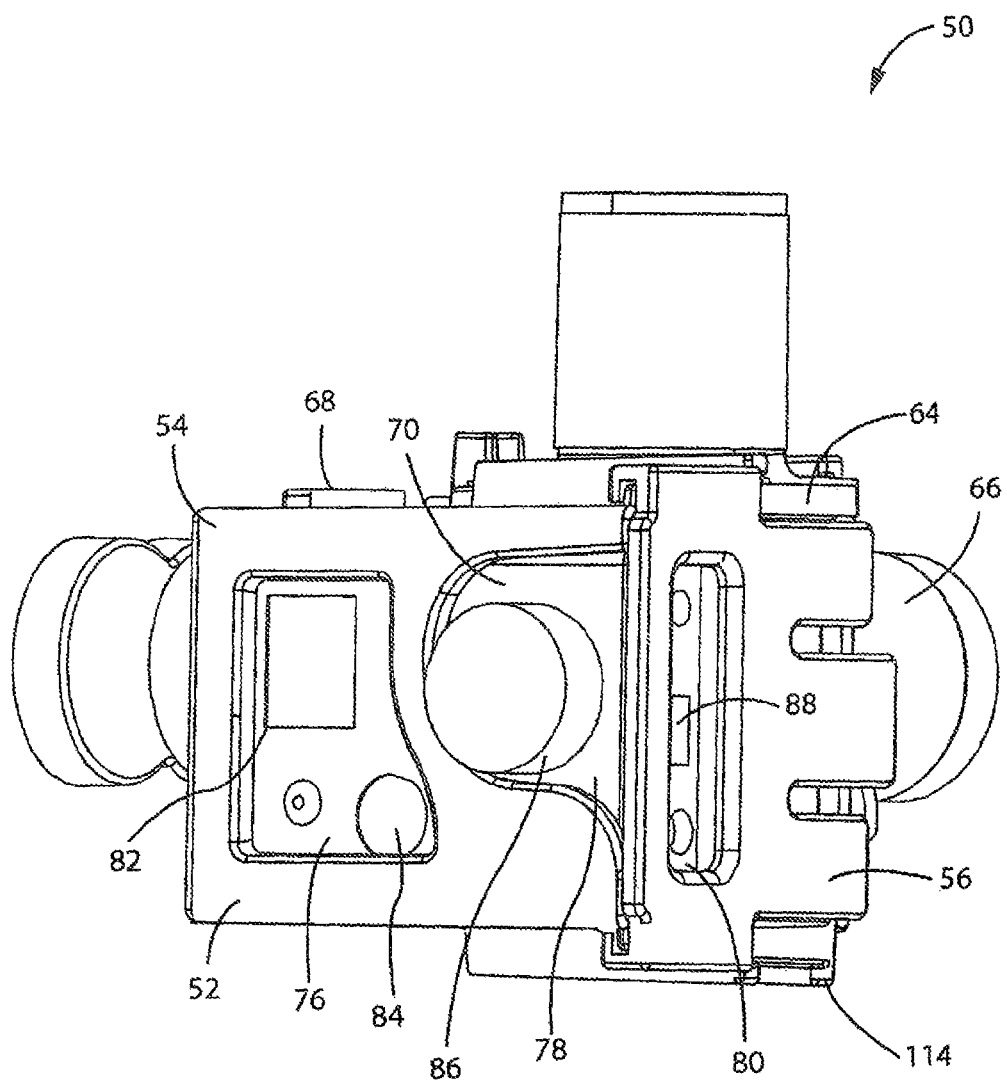
FIG. 2 is a right front perspective view of the camera accessory system shown in FIG. 1.

Referring to FIGS. 1-2, body 54 and/or cover 56 preferably include one or more openings or passages 76, 78, 80 that are shaped and oriented such that enclosure 52 does not interfere with one or more or the operational, power, and/or data capture control or retrieval interfaces or ports, such as a display 82, a power or mode selector inputs 84, a lens 86, or other control or input/output structures associated with user interaction with camera 70. It is further appreciated that body 54 and/or cover 56 can include one or more openings or structures associated with selectively securing further accessories, such as a wrist strap or the like, to enclosure 52.

Figure 3:
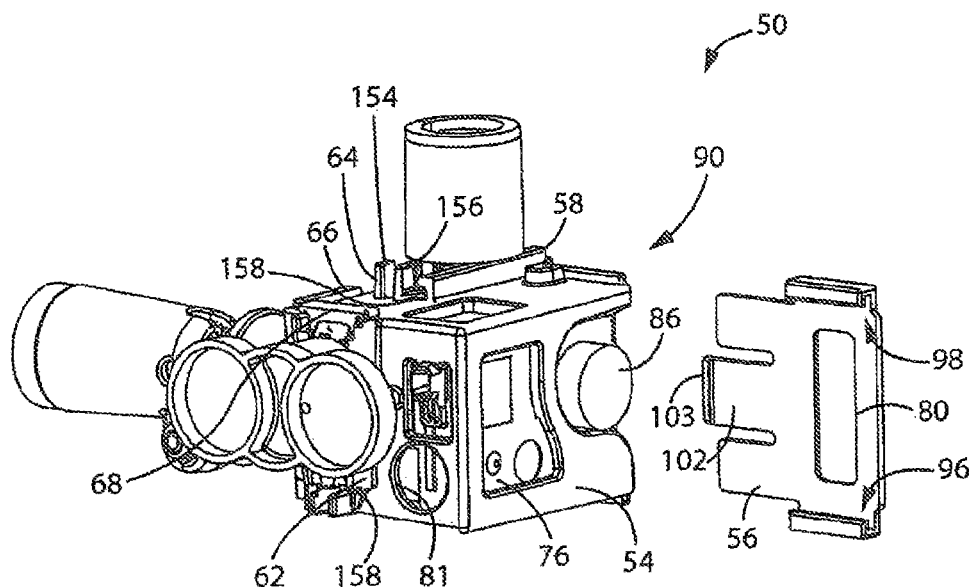
FIG. 3 is a view similar to FIG. 1 with a cover shown removed from an enclosure of the camera accessory system.
Figure 4:
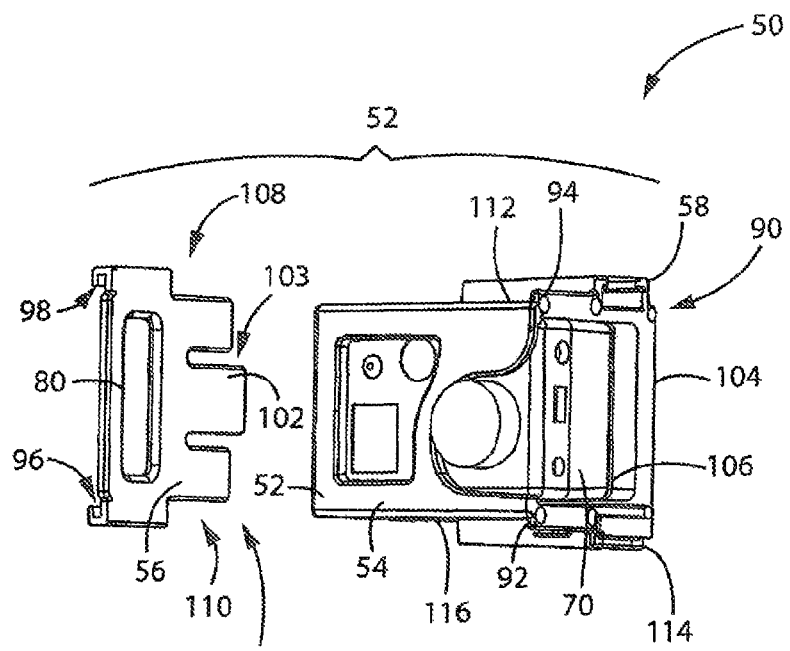
FIG. 4 is a view similar to FIG. 2 with the cover and multiple adapters removed from the enclosure.
Figure 5:
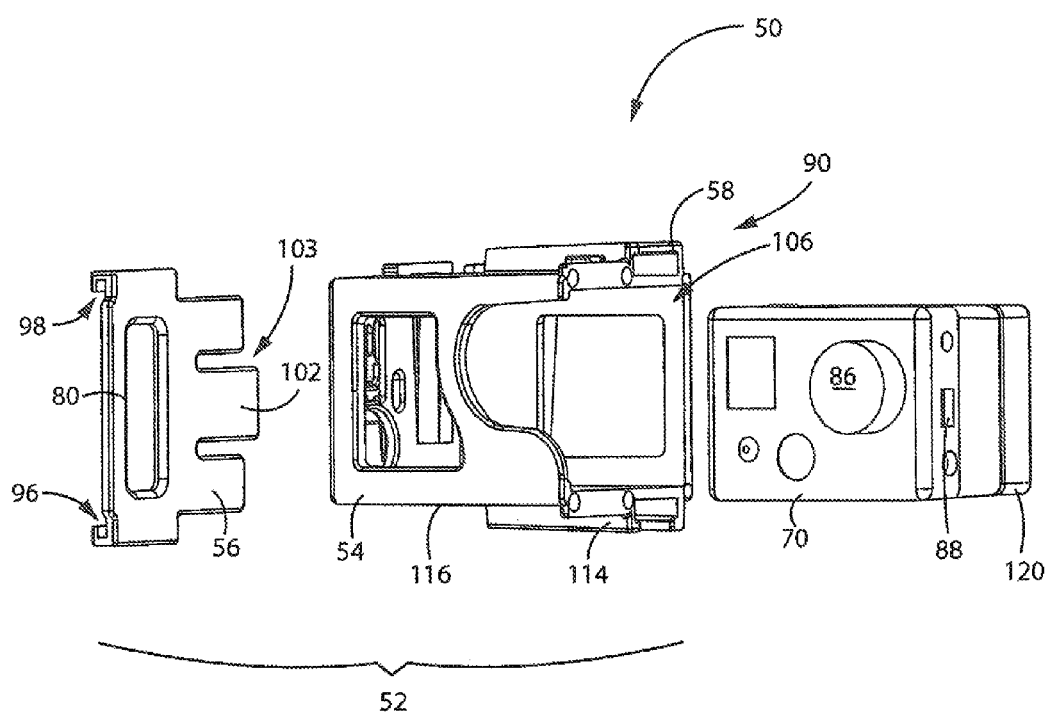
FIG. 5 is a view similar to FIG. 4 with a camera and optional spacer or other accessory removed from the enclosure.
Figure 6:
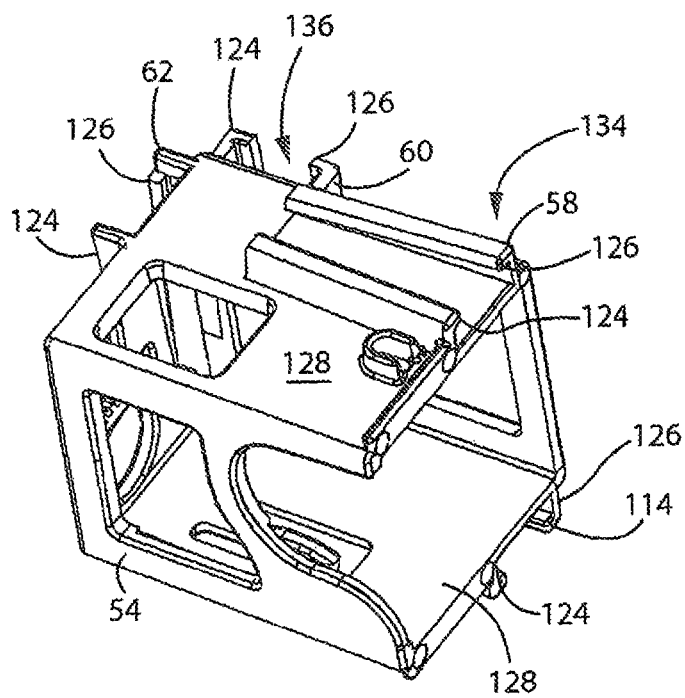
FIG. 6 is a view similar to FIG. 5 of the enclosure of the camera accessory system shown in FIG. 1.
Figure 7:
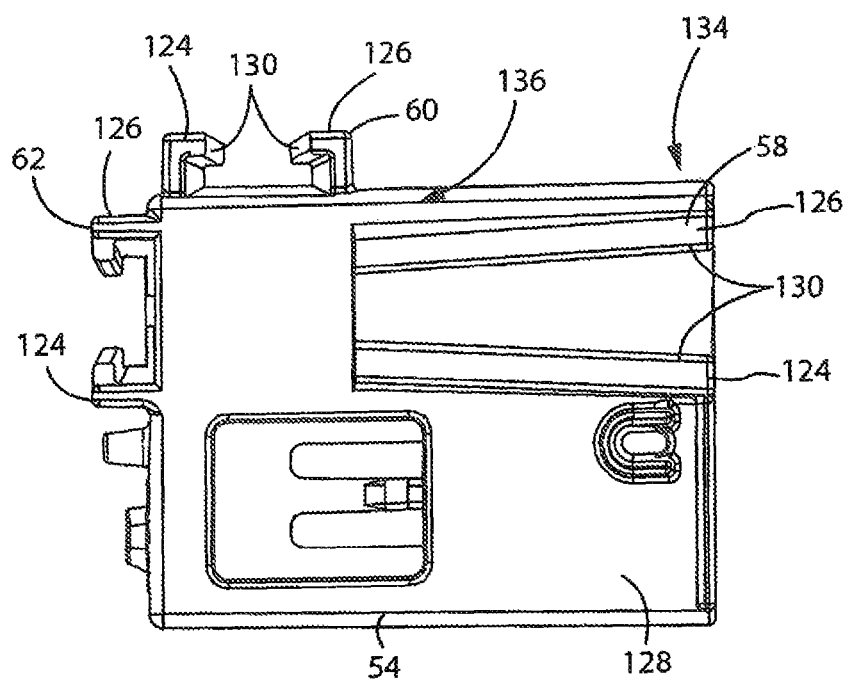
FIG. 7 is a top plan view of the enclosure shown in FIG. 6.
Figure 8:
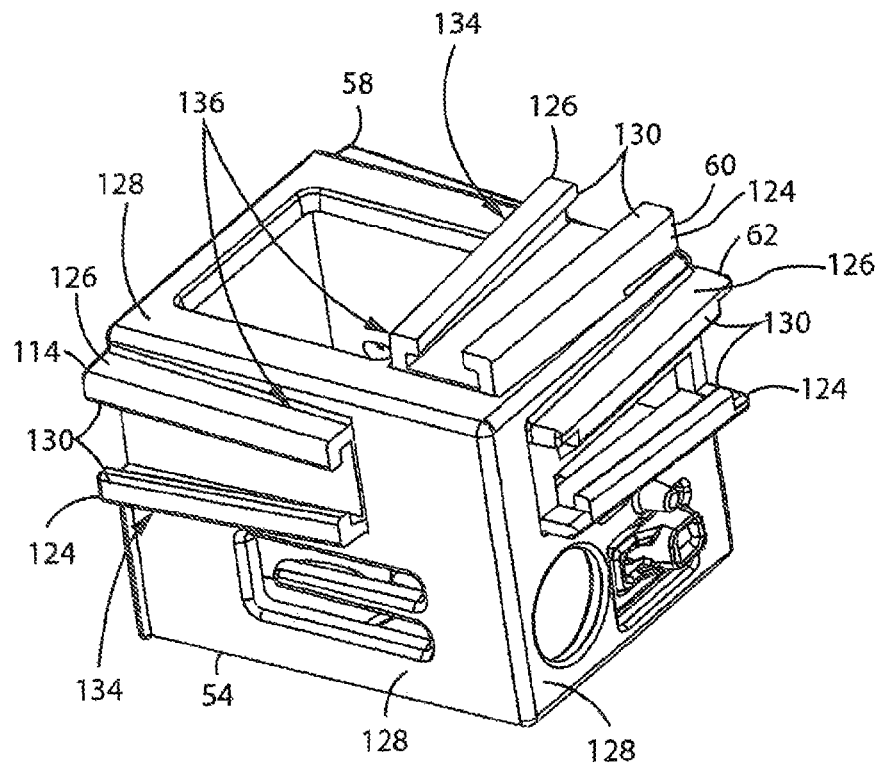
FIG. 8 is a right rear bottom perspective view of the enclosure shown in FIG. 6.
Figure 9:
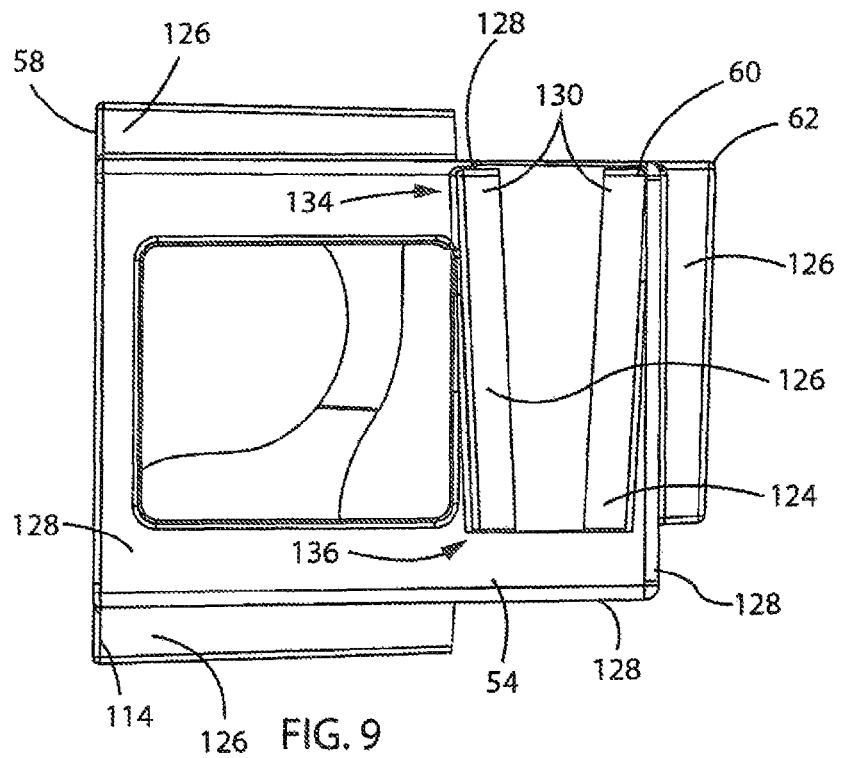
FIG. 9 is a rear elevation view of the enclosure shown in FIG. 6.

Referring to FIGS. 3-5, body 54 of enclosure 52 includes an opening 90 that is configured to slidably receive a camera 70. Body 54 includes a first flange 92 and a second flange 94 that extend in generally opposite outward directions relative to opening 90. Cover 56 includes a first channel 96 and a second channel 98 that each slidably cooperate with a respective flange 92, 94 such that cover 56 removably cooperates with body 54 of enclosure 52. It is appreciated that other interfaces, such as a pivotable or rotational connection between body 54 and cover 56 are envisioned to allow selective exposure of opening 90 when a respective camera device is intended to be inserted or removed from accessory system 50.

A rearward facing portion 100 of cover 56 includes a catch 102 that snap fittingly cooperates with a rear wall 104 of body 54 such that body 54 and cover 56 cooperate to selectively enclose camera 70 in a pocket or cavity 106 defined by enclosure 52. An outward extending tang 103 is formed on a distal end of catch 102 and extends from cover 56 in a direction generally facing body 54 of enclosure 52. Catch 102 is deflectable in directions toward and away from enclosure 52 such that tang 103 snap-fittingly cooperates with body 54. Generally opposite vertical ends of cover 56 each preferably include a cutout 108, 110. Each cutout is shaped such that when cover 56 is engaged with body 54, cover 56 does not interfere with utilization of mounting arrangement 58 associated with a top wall 112 of body 54 or another mounting arrangement 114 associated with a bottom wall 116 of body 54. It is further appreciated that the slidable interaction associated with utilization of mounting arrangements 58, 114 could be reversed such that a respective mount adapter engaged therewith would approach the respective mounting arrangement from a direction opposite the position associated with cover 56 such that cutouts 108, 110 could be reduced and/or omitted.

As shown in FIG. 5, cavity 106 is defined by body 54 of enclosure 52 and is shaped to slidably cooperate with camera 70 and an optional spacer or shim 120 associated there with. It is further appreciated that, as disclosed further below, shim 120 could be provided in various shapes or sizes to cooperate with camera 70 and accommodate the slidable association thereof with cavity 106 defined by body 54. It is further appreciated that one or more cameras 70 may be constructed to cooperate with other accessories such as auxiliary power systems, battery or power packs and/or external drives or media storage devices such that the respective shim 120 can be only selectively utilized. It is further appreciated that, as described further below, various sizes of shims can be provided such that enclosure 52 can be utilized with cameras 70 having various dimensional requirements.

FIGS. 6-9 show various views of multiple mounting arrangements 58, 60, 62, 114 associated with body 54. Each mounting arrangement 58, 60, 62, 114 includes a first flange 124 and the second flange 126 that extend from a respective sidewall 128 of body 54 of enclosure 52. Each flange 124, 126 includes a lip 130 that extends in a crossing direction relative to the respective flange and toward an adjacent flange 124, 126. Each pair of flanges 124, 126 extend in a longitudinal direction relative to the respective sidewall 128 of body 54 between a first end 134 and a second end 136 of the respective mounting arrangement. The distance between respective flanges 124, 126 associated with first end 134 is greater than the distance associated with second end 136 of the corresponding respective first and second flanges 124, 126. Said another way, flanges 124, 126 are tapered toward one another in a longitudinal direction from first end 134 toward second end 136 associated with each pair of first and second flanges 124, 126. Such a construction provides various mounting arrangements having a somewhat dove-tail or chevron type construction. As disclosed further below, each mounting arrangement 58, 60, 62, 114 is shaped to slidably removably cooperate with a respective mount adapter 64, 66, 68 for mounting and/or otherwise securing mounting structures and/or other accessories to the respective mount adapter.

Figure 10:
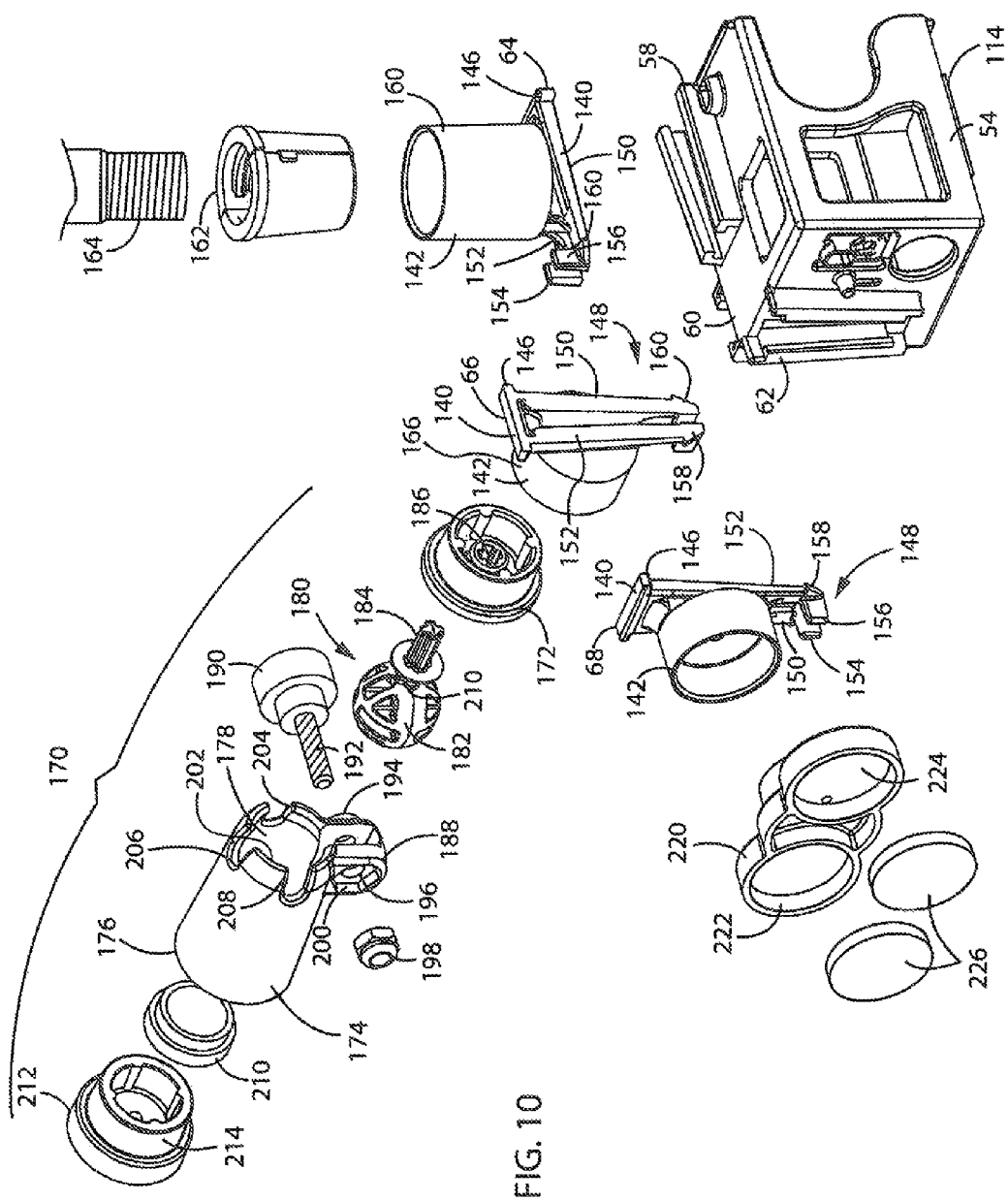
FIG. 10 is an exploded view of multiple mount adapters associated with the camera accessory system shown in FIG. 1.

FIG. 10 shows an exploded view of various accessory mounts of camera accessory system 50. Each accessory mount is configured to cooperate with one or more of accessory mount adapters 64, 66, 68 to accommodate removable cooperation of the respective amounts with a respective mount arrangement 58, 60, 62, 114 associated with body 54 of enclosure 52. Each mount adapter 64, 66, 68 includes a first portion 140 that is shaped to slidably cooperate with a respective mounting arrangement 58, 60, 62, 114 and a second portion 142 constructed to accommodate an attachment interface therewith.

The first portion 140 of each mount adapter 64, 66, 68 includes a stop portion or stop 146 and a catch portion 148 disposed at opposite longitudinal ends of the respective first portion 140. A pair of arms 150, 152 extends between stop 146 and catch 148 of each respective mount adapter 64, 66, 68. Arms 150, 152 are biased in a lateral direction away from one another but are deflectable in an opposite lateral direction, i.e. a lateral direction toward one another, to allow selective removal of a respective mount adapter 64, 66, 68 from a mounting arrangement 58, 60, 62, 114 with which it may have been associated.

Catch portion 148 of each mount adapter includes a respective handle 154, 156 associated with each arm 150, 152. A barb 158 extends in an outward lateral direction relative to each respective arm 150, 152 proximate each respective handle 154, 156. Referring briefly back to FIGS. 1 and 3, each barb 158 of each respective arm 150, 152 is constructed to snap-fittingly cooperate with a respective end 136 of a respective flange 124, 126 associated with a respective mounting arrangement 58, 60, 62, 114 with which the respective mount adapter 64, 66, 68 is engaged. During engagement of a respective mount adapter 64, 66, 68 with a respective mounting arrangement 58, 60, 62, 114, the wider insertion end associated with the mounting arrangements 58, 60, 62, 114 expedites alignment of the barbs and the arms with the channel defined by the respective flanges and corresponding lips of the respective mounting arrangement such that the user is not required to interact with handles 154, 156 during placement of a respective mount adapter relative to enclosure 52 to effectuate the secure interaction therebetween.

During removal of a respective mount adapter 64, 66, 68 from a respective mounting arrangement 58, 60, 62, 114, user interaction with the corresponding handles 154, 156 of the respective mount adapter to bias the handles toward one another allows the respective barbs 158, 160 to achieve a position wherein the barbs can bypass the respective flange associated with the respective mounting arrangement to accommodate removal of a respective mount adapter from enclosure 52. Said another way, squeezing handles 154, 156 of a respective mount adapter toward one another allows the corresponding barb 158 to bypass the respective flange 124, 126 of the corresponding mount arrangement 58, 60, 62, 114 to allow longitudinal translation of the respective mount adapter relative to the respective mounting arrangement.

When secured to body 54, flanges 124, 126 of a respective mounting arrangement 58, 60, 62, 114 are captured between and the respective tab or stop 146 and barbs 158, 160 of a respective mount adapter thereby providing a secure yet readily removable cooperation between the respective mount adapter and body 54 associated with enclosure 52. It should further be appreciated that each mount adapter, whether being connected or removed from body 54, can be manipulated in a single-handed manner. Preferably, each of mount adapters 64, 66, 68 is configured to cooperate each of mounting arrangements 58, 60, 62, 114 associated with body 54 of enclosure 52. Such a construction allows any respective mount or other accessory to be secured to base 54 in any of the positions associated with mounting arrangements 58, 60, 62, 114.

Referring back to FIG. 10, the second portion 142 of each mount adapter 64, 66, 68 can be provided in various constructions to accommodate attachment of various mount supports associated with the respective mount adapters. In one embodiment, second portion 142 associated with mount adapter 64 is formed as an elongate barrel 160 shaped to cooperate with a threaded insert 162. The threaded insert is preferably shaped cooperate with a threaded accessory 164, such as a boom or other generally rigged fixed shape handle device or the like. Such threaded interactions are fairly common in devices configured for painting or sweeping activities.

Second portion 142 associated with mount adapter 66 is formed as a barrel 166 that is generally shorter than elongate barrel 160. Barrel 166 is preferably shaped to cooperate with a pivotable or otherwise adjustable support or mount adapter assembly 170. Assembly 170 includes a base portion 172 that is constructed to be secured or otherwise attached to barrel 160. It is appreciated that base portion 172 can be rigidly or movably secured to barrel 160. A handle portion 174 includes a first open end 176 and a second open end 178 that are formed at generally opposite longitudinal ends of the handle portion 174.

Assembly 170 includes a socket stem 180 having a ball portion 182 and a stem portion 184 that are formed at opposite ends thereof. Ball portion 182 of socket stem 180 passes through open end 176 of handle portion 174 but is larger than second open end 178 of handle portion 174 such that ball portion 182 cooperates with handle portion 174 in a ball and socket manner. Stem portion 184 extends beyond second open end 178 of handle portion 174 and slidably cooperate with or is otherwise indexed relative to an opening 186 associated with base portion 172.

Handle portion 174 includes a clamp section or portion 188 that is formed proximate second open end 178. A knob 190 is attached to a stem 192 that passes through openings 194, 196 associated with clamp portion 188. A nut 198 rotationally cooperates with a threaded portion of stem 192 and axially cooperates with a pocket 200 formed about opening 196. Rotational manipulation of knob 190 relative to nut 198 manipulates the size associated with second opening 178 such that ball portion 182 can be loosely or snugly engaged with an interior surface 202 of handle portion 174. Such a construction allows expedient adjustments and achievement of various orientations of enclosure 52 relative to handle portion 174.

Handle portion 174 includes a number of cutouts 204, 206, 208 that are shaped to accommodate an interface 210 between stem portion 184 and ball portion 182 of socket stem 180. Cutouts 204, 206, 208 allow socket stem 180 to achieve various orientations that are generally orthogonal to the longitudinal axis of handle portion 174 whereas the generally circular shape associated with second opening. 178 provides for a variable generally frustoconical positioning of handle portion 174 relative to the longitudinal axis associated with stem portion 184 of socket stem 180. A stop 211 cooperates axially with the cavity associated with handle portion 174 and is constructed to loosely capture ball portion 182 of socket stem 180 between stop 211 and second opening 178 of handle portion 174.

A cap 212 includes a ridge 214 that slidably cooperates with first opening 176 of handle portion 174 such that stop 211 is generally captured between ball portion 182 of socket stem 180 and cap 212. It is further appreciated that cap 212 could be configured to provide a further connection interface between handle portion 174 and further system accessories, such as magnetic or threaded mount arrangements, as is disclosed further below. Once assembled, pivotable mount adapter assembly 170 provides a variable position handle to accommodate different orientations of body 54 relative to the longitudinal axis associated with handle portion 174.

Still referring to FIG. 10, in another embodiment, barrel portion 142 of mount adapter 68 is constructed to cooperate with a base portion 220 that defines a first cavity 222 and a second cavity 224. Cavities 222, 224 are each constructed to cooperate with the non-marring mount body 226. In a preferred embodiment, mount bodies 226 are provided as magnets, and more preferably, as rare earth magnets configured to provide a magnetic interaction with an underlying support structure, such as a metallic auto body structure, a body panel, or other metallic structures as may be available during use of camera 70. As explained further with respect to FIGS. 14-25 it is further appreciated that the various mounting arrangements may be provided in various shapes and/or configurations to accommodate the various intended uses of camera 70 by respective users.

Figure 11:
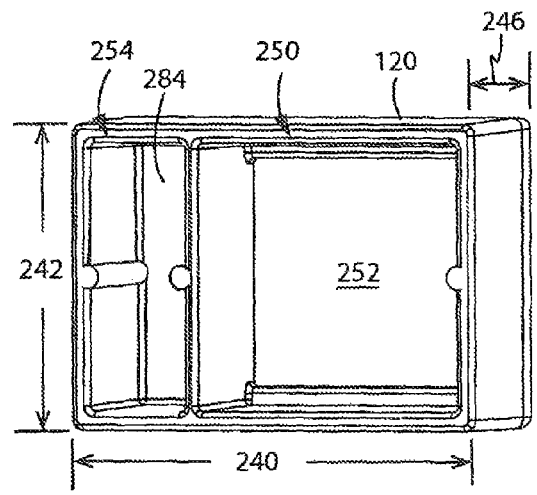
FIGS. 11-13 are perspective views of various optional spacers usable with the camera accessory system shown in FIG. 1.
Figure 12:
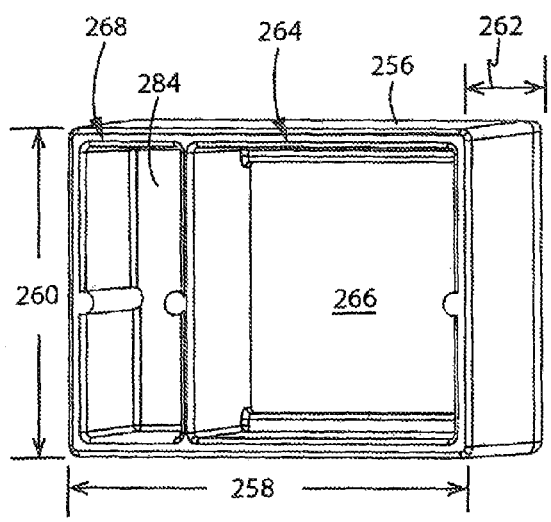
Figure 13:
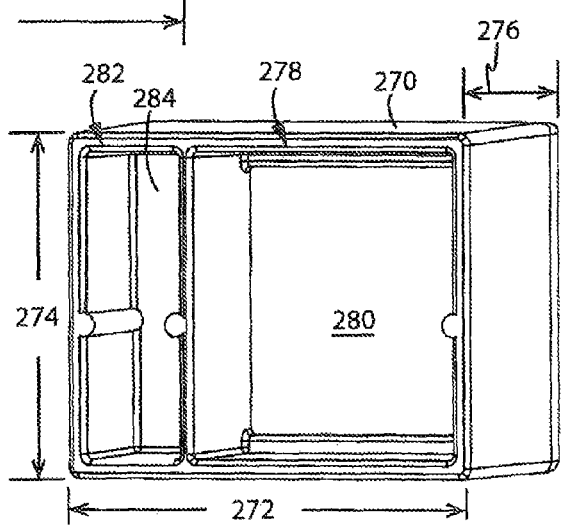

FIGS. 11-13 show various alternate embodiments of spacer 120 as described above. As shown in FIG. 11, spacer 120 is generally defined by a length 248, a height 242, and a width 246. Spacer 120 is dimensioned to cooperate with camera 70 and cavity 106 of body 54 to maintain a generally snug or non-rattling interaction between camera 70, body 54, and cover 56. Spacer 120 includes a first portion 250 that is generally defined by an opening 252 and the second portion 254. Opening 252 is shaped such that spacer 120 does not interfere with user interaction with controls or other interaction interfaces associated with camera 70—such as a rearward facing display or the like.

Referring to FIG. 12, an alternate spacer 256 has a length 258 and a height 260 generally similar to length 240 and height 242 of spacer 120. Spacer 256 has a width 262 that is generally larger than width 246 associated with spacer 120. Spacer 256 also includes a first portion 264 having an opening 266 associated therewith and a second portion 268 that is laterally offset therefrom. FIG. 13 shows another exemplary spacer 270 usable with system 50. Spacer 270 also has a length 272 and the height 274 that are generally similar to length 258 and height 260 of spacer 256. A width 276 of spacer 270 is larger than width 262 and width 246 of spacers 256, 120, respectively. Spacer 270 includes a first portion 278 associated with an opening 280 and a second portion 282 that is laterally offset from first portion 278.

Spacers 120, 256, 270 are configured to provide utilization of accessory system 50 with different camera devices having different dimensional requirements. It is further appreciated that enclosure 52 is constructed for cooperation with the respective camera 70 or other camera shapes wherein one or more of spacers 120, 256, 270 may be optionally utilized. It is further envisioned that spacers may be provided having a uniform thickness wherein one or more spaces may be utilized to provide a snug interaction between camera 70 and enclosure 52 for cameras having different dimensional requirements.

It is further appreciated that spacers 120, 256, 270 may be omitted such that camera 70 can be utilized with supplemental camera devices, such as supplemental power sources such as battery packs or the like. It is further appreciated that openings 252, 266, 280 may be omitted where the rear facing surface of camera 70 includes no operational controls associated therewith. First portions 254, 268, 282 of each of spacers, 120, 256, 270 may include a cavity 284 that may be utilized for storage of other camera accessories such as connection cables, removable drive or data cards, headphones or the like. Such a consideration further improves the utility of system 50 through accommodation of other activity related accessories.

Figure 14:
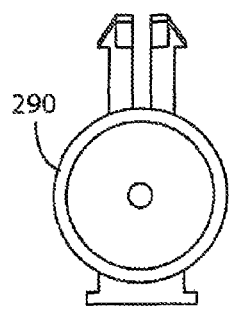
FIGS. 14-20 are various views of alternate mount adapters that selectively cooperate with enclosure of the camera accessory system shown in FIG. 1.
Figure 18:
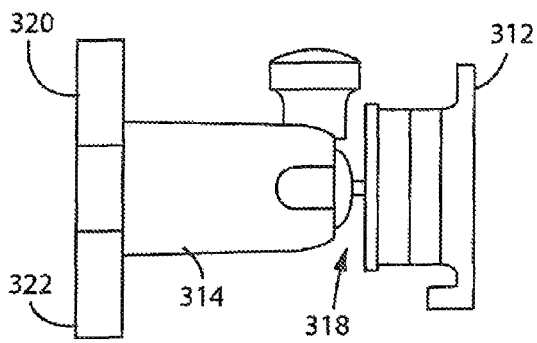
Figure 19:
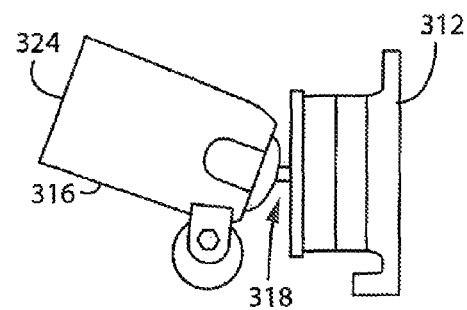
Figure 20:
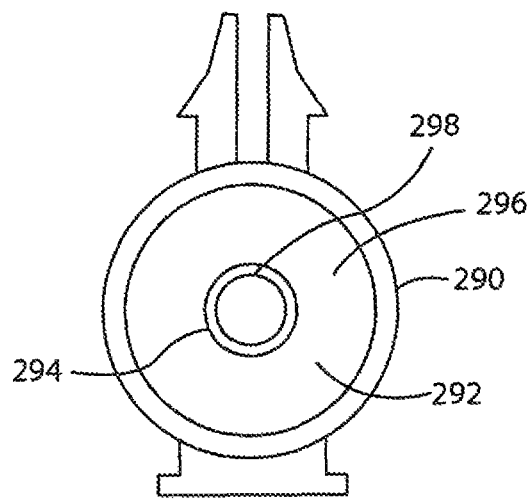

FIGS. 14-25 show various views of alternative mount adapter configurations associated configured for removable cooperation with enclosure 52 of accessory system 50. Referring to FIGS. 14 and 20, one accessory mount includes a single shallow barrel portion 290 shaped to cooperate with a mounting accessory, such as a magnet or rare earth magnet, or other accessory, such as a level or inclination indicator such as a bubble vial 292 (FIG. 20). As is commonly understood, vial 292 includes an indicator 294 and contains a fluid 296 having a bubble 298 associated therewith. When engaged with enclosure 52, the position of bubble 298 relative to indicator 294 provides an indication as to the inclination or pitch associated with enclosure 52 and the camera device associated therewith. Said in another way, vial 292 can provide an indication as to the gravitational pitch of camera 70. Such an indication allows the user to generate generally level photographic or video data when desired.

Figure 15:
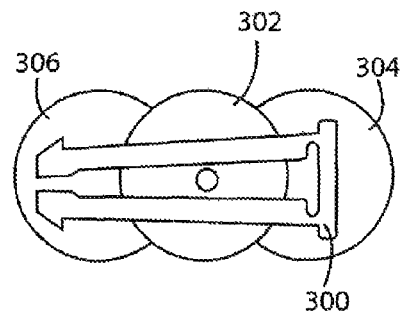
Figure 17:
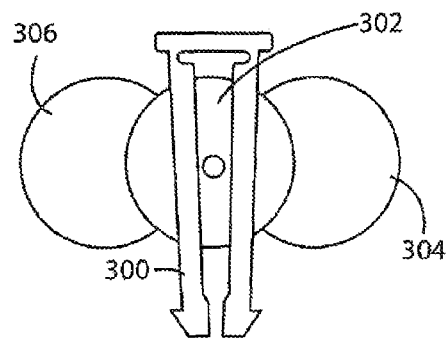

FIGS. 15 and 17 show alternate orientations of a mount adapter 300 relative to a body or base 302 associated with containing two non-marring mount adapters such as magnets or rare earth magnets. As shown in FIG. 15, the longitudinal axis associated with mount adapter 300 is oriented to extend generally behind a pair of lobes 304, 306 associated with base 302 whereas FIG. 17 shows a crossing orientation of the longitudinal axis of mount adapter 300 relative to the longitudinal axis associated with lobes 304, 306. It should be appreciated that mount adapter 300 could be rigidly connected to base 302 and provided in the various relative orientations relative thereto or provided in a rotational interface wherein mount adapter 300 is pivotably or rotationally connected to base 302 to achieve various relative orientations therebetween. When provided in a rotational interface, is appreciated that mount adapter 300 could be rotationally connected to base 302 in an indexing manner so as to provide a visual, audible, and/or tactile indication as to the relative orientation of mount adapter 300 relative to base 302.

Figure 16:
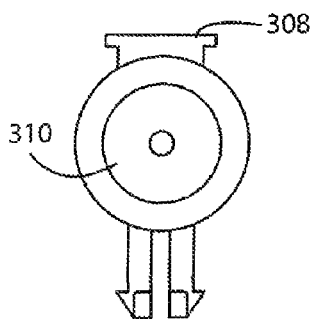

FIG. 16 shows a mount adapter 308 having a deep barrel portion 310 constructed to provide a rotational interface with threaded stem portions of accessories such as boom handles or the like when mount adapter 308 is connected to enclosure 52. FIGS. 18 and 19 show various views of a mount adapter 312 connected to an accessory body 314, 316 having a pivotable, movable, or rotational connection interface 318 formed therebetween. As shown in FIG. 18, accessory body 314 is generally defined by first and second lobes 320, 322 associated with accommodating non-marring attachment interfaces such as magnets or rare earth magnets as previously described. In an alternate embodiment, as shown in FIG. 19, accessory body 316 includes a distal end 324 that is constructed to cooperate with the non-marring attachment interface such as a magnet or rare earth magnet, as described above with respect to FIG. 14, or a threaded interface as described above with respect to FIG. 16.

The various mount adapters shown in FIGS. 14-19 provide a breadth of connection interfaces for attaching accessories to enclosure 52 and/or different connection modalities associated with an underlying support structure and/or further accessories such as boom or extension handles or the like to improve the utility with which enclosure 52 and the camera associated therewith, can be utilized and/or supported.

Figure 21:
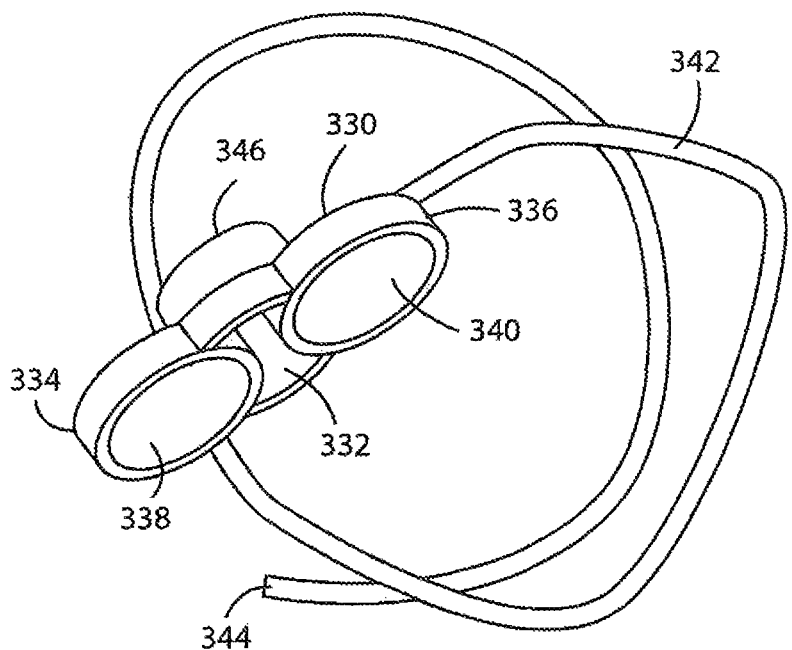
FIG. 21 is a perspective view of a tether mount adapter usable with camera accessory system shown in FIG. 1.

FIG. 21 shows a further mount accessory 330 according to a further aspect of the invention. Mount accessory 330 includes a base 332 defined by a first lobe 334 and a second lobe 336 shaped to cooperate with first and second non-marring engagement interfaces 338, 340, such as magnets or rare earth magnets. A flexible member or tether 342 extends from base 332 and terminates at a distal end 344 thereof so as to provide a remote support of mount accessory 330 relative to an underlying support surface. For instance, mount accessory 330 magnetically cooperates with other magnetic mount accessories so as to provide various support configurations associated with accessory system 50. By way of example, mount accessory 330 may be disposed on one side of a non-magnetic material, such as glass for instance, and magnetically cooperate with another accessory mount, such as that shown in FIG. 18, disposed on an opposite side of the non-magnetic surface. The distal end 344 of tether 342 may be captured between adjacent structures, such as between the window and window jam associated with glass surfaces were additional support associated with use of camera 70 is desired. Alternatively, it is appreciated that a boss 346 associated with body 332 may be configured to cooperate with shallow barrel 290 and/or threaded barrel 310 so as to provide a tethered and magnetic support of the respective accessory mount associated therewith thereby further enhancing the capabilities of system 50.

Figure 22:
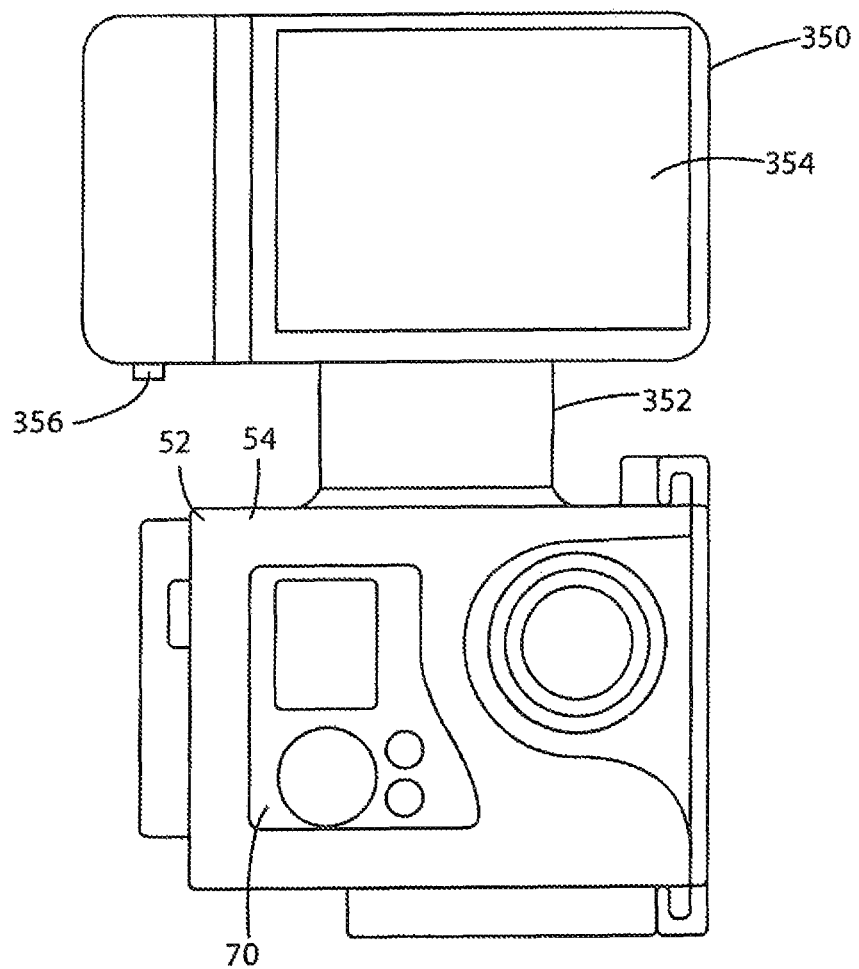
FIG. 22 is an elevation view of the camera accessory system shown in FIG. 1 with a light source removably engaged therewith.
Figure 23:
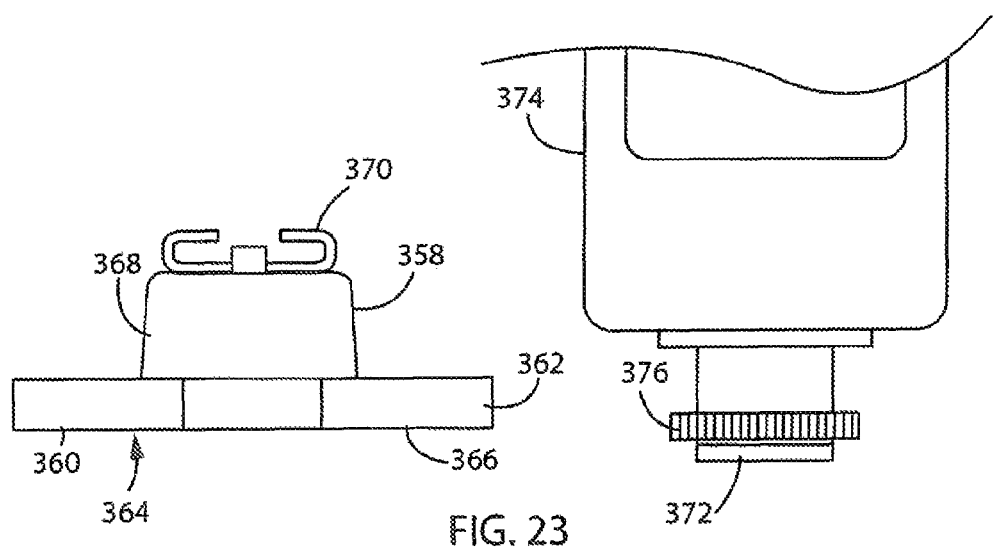
FIG. 23 is an exploded view of the mount adapter and light source shown in FIG. 22.
Figure 24:
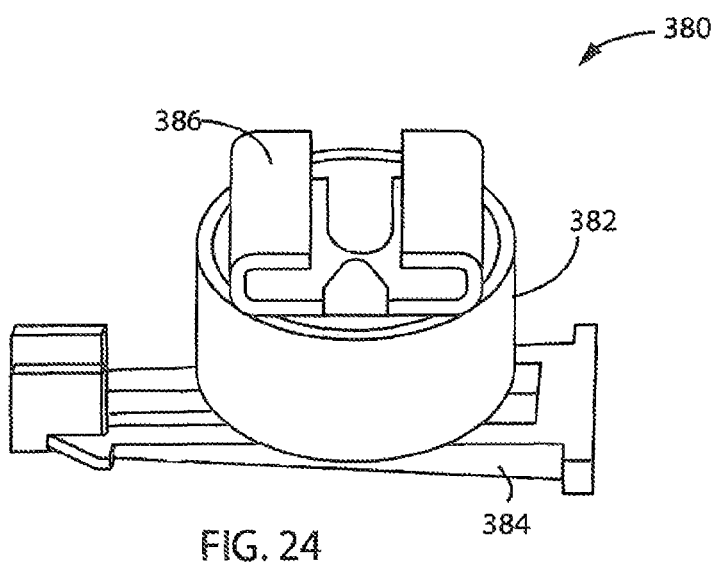
FIG. 24 is a perspective view of the light source mount adapter shown in FIG. 23.

FIGS. 22-24 show various alternative embodiments of adapter mounts, associated with securing additional accessories, such as a flash or light source 352, relative to an enclosure 52 having camera 70 associated therewith. As shown in FIG. 22, a mount arrangement 353 is removably engaged with body 54 of enclosure 52 and is disposed between light source 350 and enclosure 52. Light source 350 includes one or more illumination devices 354, such as LED's for example, and can include an optional operational switch 356. It is appreciated that light source 350 can be independently powered and operated and/or powered by an operative association with camera 70 and/or the systems associated with operation thereof.

Referring to FIG. 23, in an alternate embodiment, a mount adapter 358 includes first and second lobes 360, 362 that are configured to cooperate with non-marring attachment devices such as magnets or rare earth magnets 364, 366 to facilitate removable cooperation with enclosure 52, an additional mount adapter, as described above, or other support surfaces and/or surfaces remote from enclosure 52. Mount adapter 358 includes a barrel portion 368 having a clip 370 disposed at an end thereof. Clip 370 slidably cooperates with a base 372 of with light source 374. A lock ring 376 is disposed proximate base 372 and operable so as to secure light source 374 to clip 371 when desired.

In an alternate embodiment, as shown in FIG. 24, a light source mount adapter 380 includes a barrel portion 382 and a mount adapter 384 shaped to slidably cooperate with one or more of the mount arrangements associated with body 54 of enclosure 52. A clip 386 is attached to barrel portion 382 and cooperates with the base 372 (FIG. 23) of light source 374 as described above. It is further appreciated that clip 386 can be rigidly connected to barrel 382 or rotationally associated therewith so as to allow the variable positioning of light source 374 relative to the longitudinal axis associated with mount adapter 384. Such a construction allows the variable positioning of the direction of light source 374 to achieve the desired orientation of the light source relative to the direction of the lens associated with camera 70 when use of light source 374 is desired.

Figure 25:
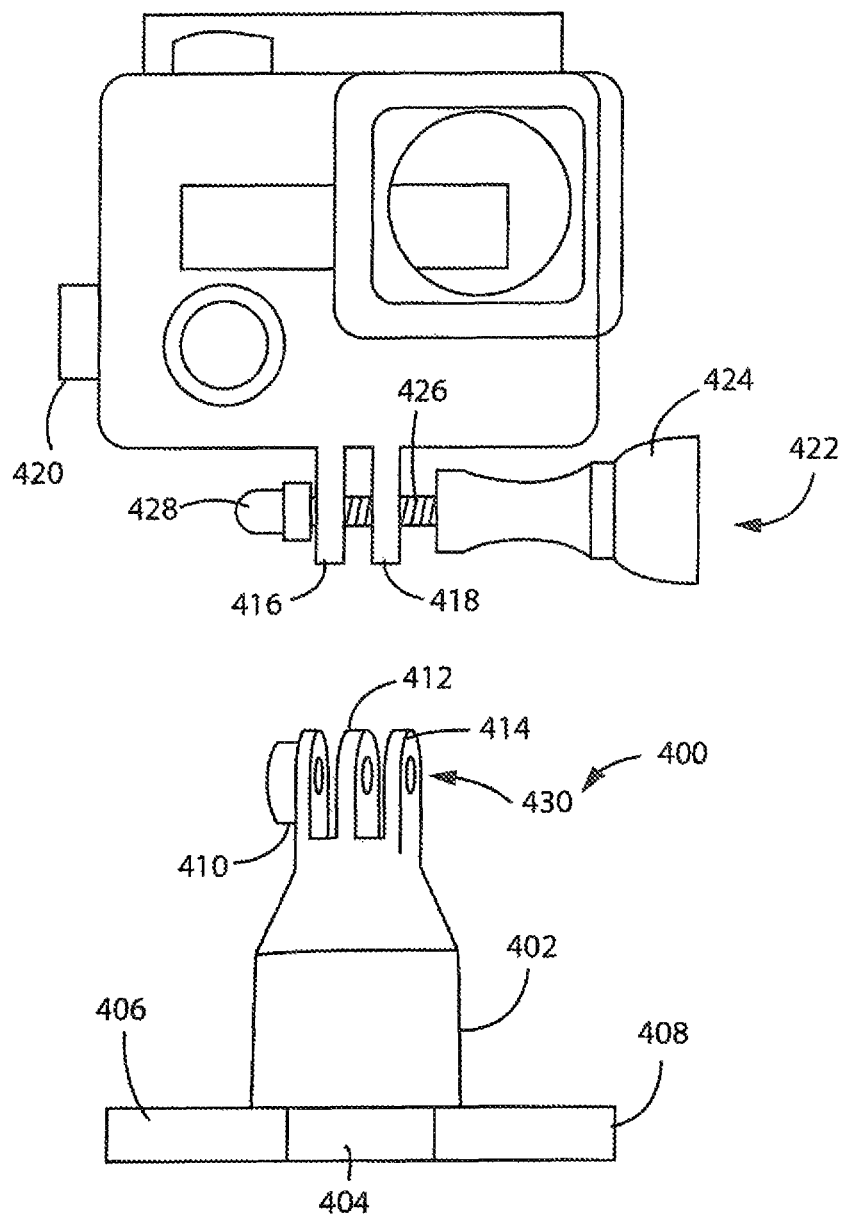
FIG. 25 shows a mount adapter according to another embodiment of the invention.

FIG. 25 shows a mount adapter 400 according to yet another embodiment of the present invention. Mount adapter 400 includes a barrel portion 402 associated with a base 404 having a first lobe 406 and the second lobe 408 wherein each lobe 406, 408 is constructed to cooperate with a non-marring engagement device such as a magnet or rare earth magnet. A plurality of tabs 410, 412, 414 extend from barrel portion 402 and cooperate with tabs 416, 418 associated with the enclosure 420 associated with a camera device. Clamp body 422 includes a handle or handle portion 424, a stem 426, and a nut 428 that rotationally cooperates with stem 426. When tabs 410, 412, 414 are aligned with tabs 416, 418, stem 426 is translational relative to a passage 430 defined by the respective tabs 410, 412, 414, 416, 418 such that tightening of handle portion 424 relative to nut 428 creates a compressive frictional interface between the plurality of tabs so as to define and orientation of enclosure 420 relative to mount adapter 400. It should be appreciated that the cooperation between tabs 410, 412, 414, 416, 418 accommodates rotational cooperation and variable rotational positioning of enclosure 420 relative to mount adapter 400.

Figure 26:
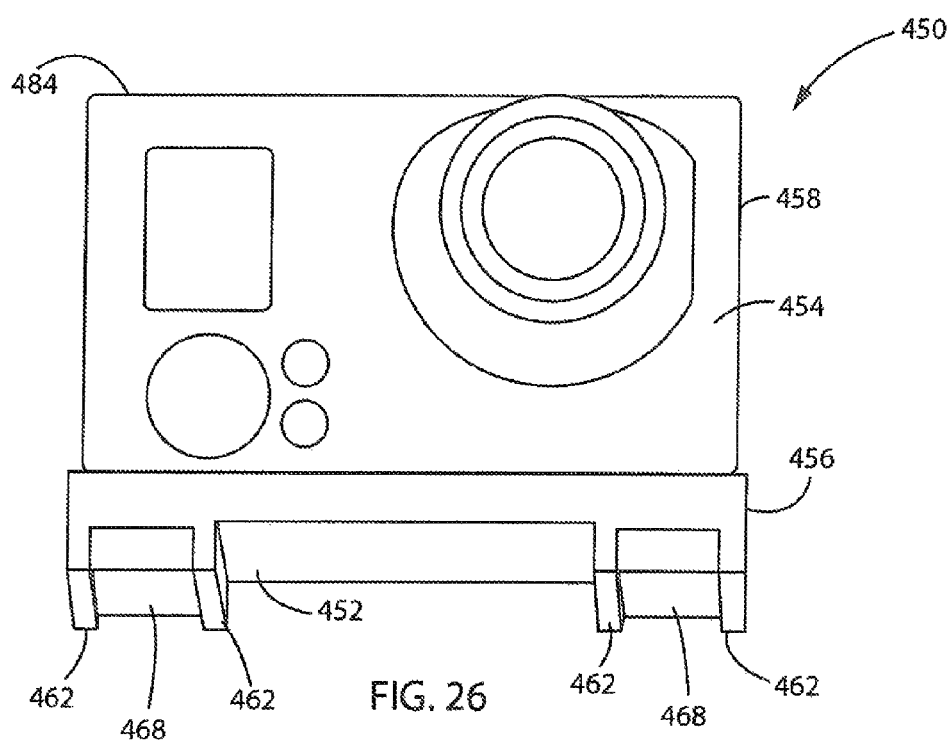
FIG. 26 shows a camera accessory system according to another embodiment of the invention with the camera engaged therewith.
Figure 27:
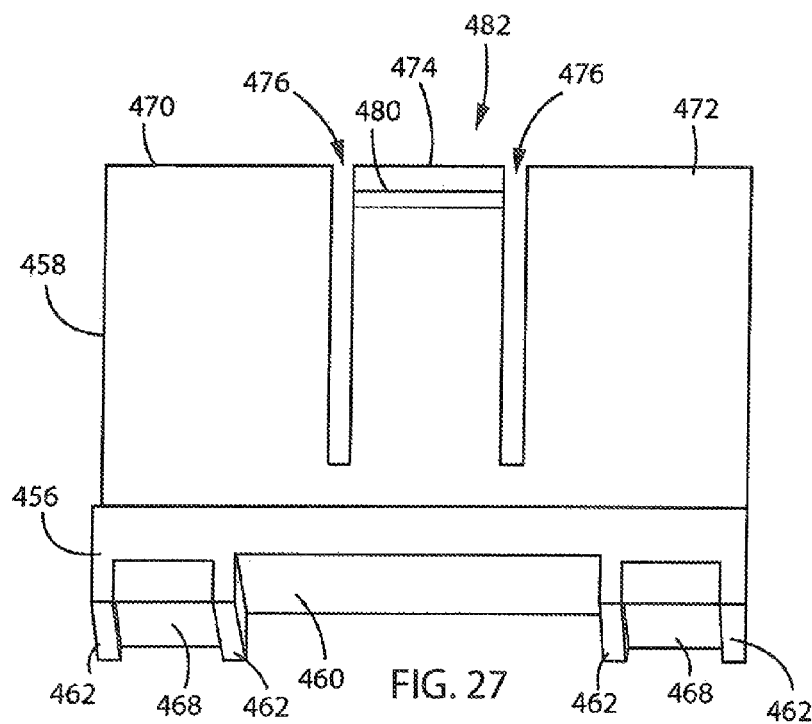
FIG. 27 is a view similar to FIG. 26 with the camera removed from the camera accessory system shown therein.

FIGS. 26-36 disclose a camera case accessory system 450 according to another embodiment of the invention. Accessory system 450 includes a generally open enclosure or base 452 that is shaped to removably cooperate with a camera device 454. Referring to FIGS. 26 and 27, base 452 includes a first portion 456 that extends generally along a bottom portion of camera device 454 and a second portion 458 that extends generally along a rearward facing surface of camera device 454. An outward facing side 460 of first portion 456 includes one or more projections 462 that extend in a generally downward direction and are shaped to receive a non-marring mounting device, such as a magnet or rare earth magnet 468 between one or more of the adjacent projections 462. Referring briefly to FIG. 33, it is further envisioned that one of projections 464 can also extend in an outward direction from second portion 458 and be configured to cooperate with, a non-marring engagement device 466, such as a magnet or rare earth magnet. Such a configuration allows system 450 to be engaged with underlying support surfaces in various orientations to provide different orientations of camera device 454 (FIG. 26) relative thereto.

Second portion 458 of base 452 includes alternate lateral side portions 470, 472 and a middle portion or generally center portion 474. A slot of gap 476 is formed along a portion of the height of second portion 458 between side portions 470, 472 and center portion 474. Gaps 476 allow deflection of center portion 474 relative to side portions 470, 472. As disclosed further below, a catch or lip 480 is formed at a distal end 482 of center portion 474 and snap-fittingly cooperates with a top surface 484 (FIG. 26) of camera device 454 so as to secure camera device 454 relative to system 450.

Referring to FIGS. 28-33, first portion 456 of base 452 includes a lip or rib 486 that extends about a perimeter of first portion 456. An opening 490 is formed through first portion 456 proximate the interface of first portion 456 and second portion 458. Opening 490 prevents the collection of debris or fluids within the perimeter of rib 486 associated with first portion 456. As shown in FIG. 31, accessory mount system 450 can include one or more generally planar legend surfaces 493 that are configured to provide signage or the like associated with the source or manufacture of accessory system 450, identification of camera devices useable therewith, or other suitable information associated with the source or usage of system 450.

Referring to FIG. 32, lip 480 can include an overlapping surface 494 associated with accommodating the rotational positioning of camera device 454 relative thereto. Preferably, surface 494 is oriented at an angle 496 configured to accommodate the deflection of center portion 474 and the cooperation of surface 494 with the top surface of camera 454 when camera device 454 is associated with, or removed from, accessory system 450. Preferably, angle 496 is approximately 4 degrees from orthogonal relative to second portion of base 452. It is further appreciated that the length of extension of lip 480 relative to a camera facing surface 498 of second portion 458, the thickness associated with center portion 474, and/or the degree of extension of gaps 476 along the length of second portion 458 can be adjusted or otherwise provided or configured to provide the desired degree of resistance to translation of camera device 454 relative to system 450 to provide a secure interaction therebetween but which can be conveniently manipulated by the user to effectuate placement or removal of the camera device relative thereto.

Figure 34:
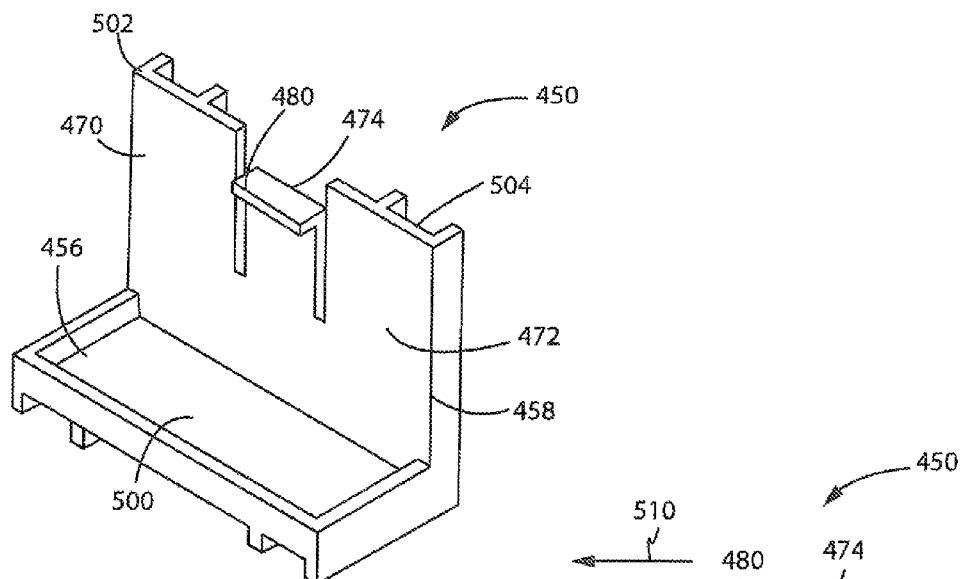
FIG. 34 is a view similar to FIG. 33 of a camera accessory system according to another embodiment of the present invention.
Figure 35:
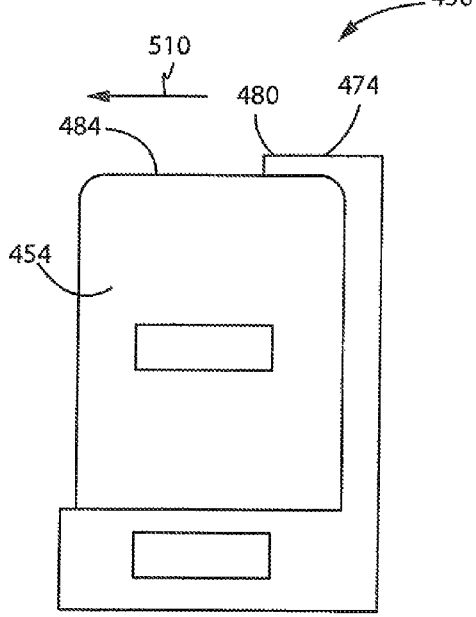
FIG. 35 is a side elevation view of the camera accessory system similar to that shown in FIG. 33 and an alternate embodiment associated with the removable cooperation of the camera engaged therewith.
Figure 36:
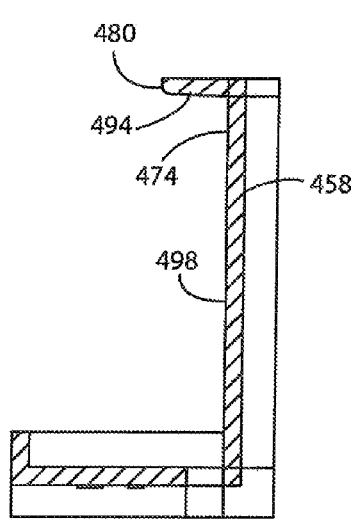
FIG. 36 is a view similar to FIG. 31 and shows a cross-sectional view associated with the camera accessory system shown in FIG. 35.

FIG. 34 shows an alternate configuration of center portion 474 of accessory system 450 wherein lip 480 is located nearer the floor 500 of first portion 456 than distal ends 502, 504 of side portions 470, 472 associated with second portion 458. It is further appreciated that an adjustable interface or connection could be provided between center portion 474 and the remainder of second portion 472 so as to manipulate the distance between lip 480 and floor 500 to accommodate cooperation of accessory system 450 with cameras having different vertical heights. In the configuration shown in FIG. 35, lip 480 of accessory system 450 is shown as extending in a greater lateral direction, indicated by arrow 510 so as to provide greater frictional interaction between center portion 474 of second portion of base 452 and top surface 484 of camera device 454. As indicated in FIG. 36, lip 480 can extend a greater distance from surface 498 associated with second portion 458 so as to provide secure interaction with top surface 484 of camera device 454. Is further envision that the angle 496 with which lip 480 extends from center portion 474 can be provided in a generally orthogonal orientation to provide greater surface interface between surface 494 of lip 480 with top surface 484 of camera device 454.

Figure 37:
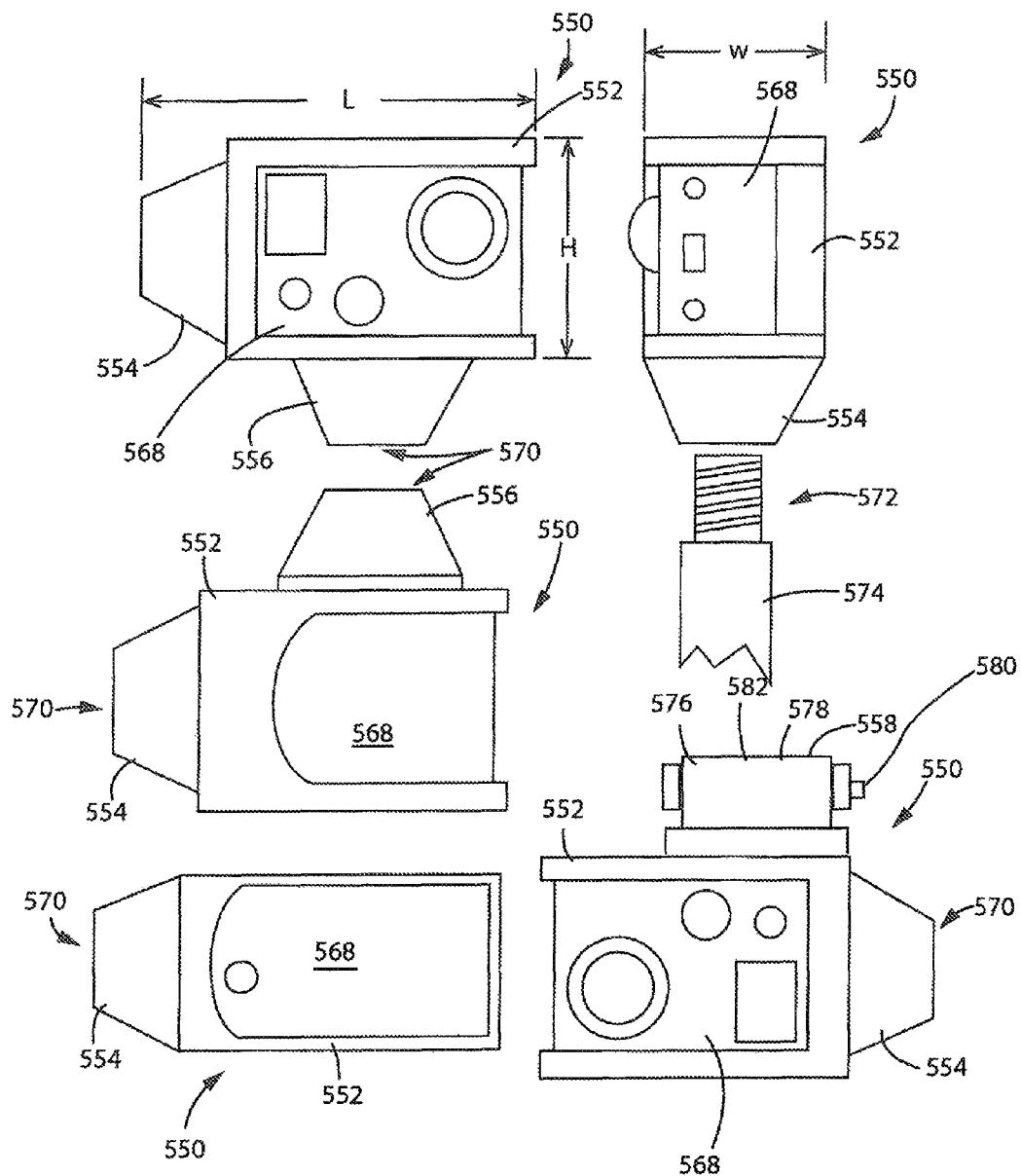
FIG. 37 shows various view of a camera device engaged with a camera accessory system according to another embodiment of the invention.
Figure 38:
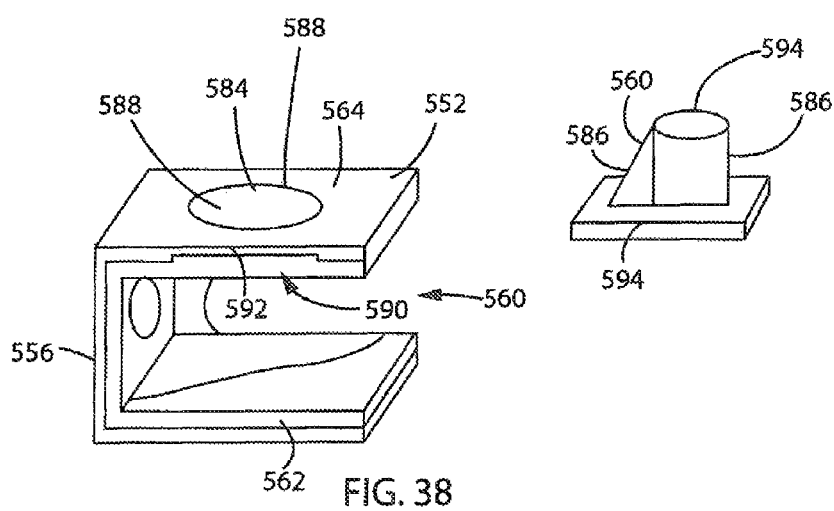
FIG. 38 shows the camera accessory system of FIG. 37 with a mount accessory exploded from an enclosure and the camera device removed therefrom.
Figure 39:
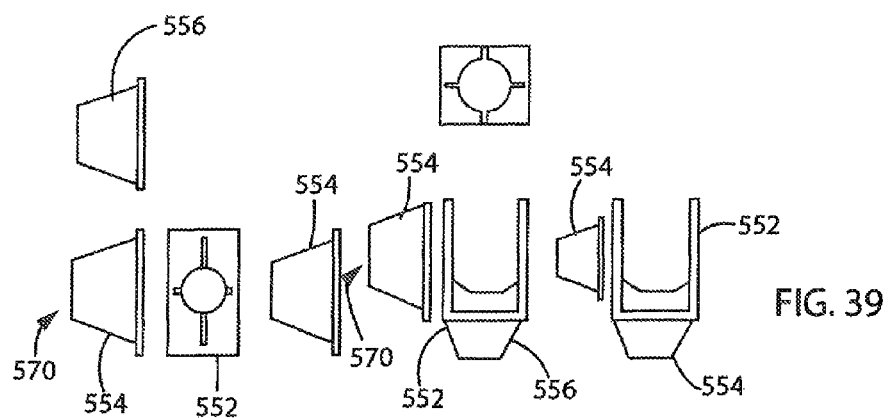
FIG. 39 shows various views of the camera accessory device shown in FIG. 38 with various accessory devices exploded from the enclosure.

FIGS. 37-39 show various views of a camera accessory system 550 according to another embodiment of the invention. System 550 includes an enclosure 552 that is constructed to removably cooperate with one or more accessory mounts 554, 556, 558, 560 (FIG. 38). Enclosure 552 includes an open end 560 that is generally defined by a bottom side wall 562, a top side wall 564, and a vertical side wall 566 that extends between the respective top and bottom side walls proximate a respective end thereof. Enclosure 552 is shaped to generally snap-fittingly cooperate with a camera device 568 such that the various operational controls and inputs associated with operation of camera 568 are fully accessible to a user when camera device 568 is engaged with enclosure 552. It is further envisioned that enclosure 552 can be provided in various shapes with various dimensions H, L, W to accommodate cooperation of enclosure 552 with camera devices having different exterior contours, shapes, or sizes. Walls 562, 564, 566 are constructed to allow outward lateral deflection of the free ends associated with top and bottom side walls 562, 564 such that camera device 568 can slidably cooperate with the area bounded by sidewalls 562, 564, 566 and such that a hysteresis associated with enclosure 552 allows camera device 568 to snap-fittingly cooperate therewith.

System 550 includes various accessory mounts 554, 556, 558, 560 that are each shaped to removably cooperate with each of the respective walls 562, 564, 566 associated with enclosure 552. Accessory mounts 554, 556, 560 include a threaded bore 570 that is shaped to cooperate with a threaded end 572 of a support accessory 574 (FIG. 37). As shown in FIG. 37, accessory mount 558 includes a pair of upstanding walls 576, 578 and a fastener 580 that extends therebetween. A gap 582 is formed between adjacent ends of walls 576, 570 such that user manipulation of fastener 578 can provide a compressive interaction with accessory associated with accessory mount 558. Alternatively, it is envisioned that the respective accessory can include a closed bore passage such that, when fastener 578 is engaged therewith, the shaft of fastener 578 prevents translation of the accessory relative to accessory mount 558.

Each of accessory mounts 554, 556, 558, 560 can slidably or removably cooperate with enclosure 552 in a manner similar to that described above. Alternatively, referring to FIG. 38, in one such removable configuration, enclosure 552 can include one or more openings 584 shaped the slidably cooperate with one or more of accessory mounts 554, 556, 558, 560 wherein the slidable cooperation can be interfered with via cooperation of the camera device 568 with enclosure 552. As shown in FIG. 38, in such a configuration accessory mount 560 includes one or more ribs 586 that are shaped the slidably cooperate with one or more channels 588 associated with opening 584 defined by enclosure 552. An interior surface 590 of enclosure 552 includes a recess 592 that is shaped to receive a base portion 594 of accessory mount 560. It should be appreciated that in such a configuration the respective accessory mount 560 is associated with a respective opening 584 of enclosure 552 via passage of a stem portion 594 associated with accessory mount 560 through opening 584 from an inward to outward direction. That is, accessory mount 560 is associated and translated through the respective opening 584 from a position generally between sidewalls 562, 564.

When provided in such a configuration, it should be appreciated that such interaction requires removal of camera device 568 from enclosure 552 to effectuate the desired placement and/or removal of the respective accessory mount 560 from enclosure 552. When camera device 568 is engaged with enclosure 552, camera device 568 prevents inward lateral translation of the respective accessory mount 560 relative to enclosure 552 thereby providing a secure interaction therebetween. The cooperation of ribs 586 with channels 588 associated with opening 584 allows secure rotational interaction between accessory mount 560 and enclosure 552 such that a respective accessory 574 (FIG. 37) having a threaded interaction, can be readily associated with an removed from the respective accessory mount 560 via the non-rotational association between the respective accessory mount 560 and enclosure 552.

It is further appreciated that the various accessory mounts 554, 556, 558, 560 could be configured to accommodate one or more of the various alternative accessories disclosed above to provide similar functionality associated therewith. It is further envisioned that one or more of the accessories, such as the magnetic mount or inclination indicators, as described above could be configured to removably cooperate the connection modality associated with any of accessory mounts 554, 556, 558, 560 such that the user can, removable secure the desired accessory or accessory support relative to a desired accessory mount which removably and interchangeably cooperates with enclosure 552 such that system 550 can be configured to accommodate various user objectives associated with the desired usage and support of camera device 568.

The various camera accessory systems disclosed herein provide camera case and accessory system that can be conveniently configured to provided various support configuration and connection of various camera accessories associated with achieving a desired use of the underlying camera device. The various accessory systems do not otherwise interfere with the use of the fimctionality of the underlying camera device and do so in a manner wherein the camera device can be utilized in a generally hands free but fully supported manner.

Therefore, one embodiment of the invention includes a camera accessory system having an enclosure defined by a body and a cover. The enclosure defines a cavity that is shaped to receive a camera device and the cover is movably connected to the body to allow access to the cavity such that the camera device can be inserted or removed from the cavity when the cover is in an open position relative to the body. At least one opening is formed through the enclosure and is positioned to overlie an interface associated with user interaction with the camera device. The system includes first and second mount arrangements and an accessory mount. The first and second mount arrangements are defined by an exterior surface of the enclosure and the first mount arrangement is associated with a first side of the enclosure and the second mount arrangement is associated with a second side of the enclosure. The accessory mount slidably cooperates with each of the first mount arrangement and the second mount arrangement such that the orientation of the accessory mount relative to the enclosure can be manipulated.

Another embodiment of the invention that is useable with one or more of the features of the above embodiment includes a camera case system having a body that is defined by a first portion and a second portion that is oriented in a crossing direction relative to the first portion. A rib extends about a perimeter of the first portion in a direction similar to the second portion and extends a distance that is shorter than the second portion of the body such that a camera device can be snuggly disposed within a boundary defined by the first portion, the second portion and the rib. A catch is supported by the second portion and offset from the first portion and the rib. The catch is deflectable relative to the second portion and includes a barb that is formed at an end of the catch that is offset from the first portion. The barb extends over a footprint defined by an area of the first portion bounded by the rib. The barb is positioned relative to the catch such that the barb slidably cooperates with a surface of the camera device that is opposite a surface of the camera device adjacent the first portion such that the camera device is captured on respective sides by the first portion and second portion of the body, the rib, and the barb.

Another embodiment of the invention that is usable with one or more of the above embodiments discloses a method of forming a camera case system. The method includes providing a base that removably cooperates with a camera device and which cooperates with the camera device without interfering with user interaction with at least one of the controls associated with operation of the camera device. A plurality of mount arrangements are formed on an exterior surface of the base and a mount adapter is provided that removably cooperates with each of the mount arrangements.

It is appreciated that the various camera case and accessory systems disclosed herein include various additions, modifications, and rearrangements that are within capabilities of those skilled in the art from the disclosure of the present application. It is intended that the appended claims cover all such additions, modifications, and rearrangements. Expedient embodiments of the present invention are differentiated by the appended claims which also form part of the specification.

What is claimed is:

1. A camera accessory system comprising:
an enclosure defined by a body and a cover, the enclosure defining a cavity shaped to receive a camera device;
the cover being movable connected to the body to allow access to the cavity such that the camera device can be inserted or removed from the cavity via relative translation in a direction generally transverse to a lens facing side of the camera device when the cover is in an open position relative to the body;
at least one opening formed through the enclosure, the at least opening being unobstructed and positioned in the enclosure to overlie an interface associated with user interaction with the camera device allowing the user to directly engage the interface associated with the opening;
a first mount arrangement defined by an exterior surface of the enclosure associated with a first side of the enclosure;
a second mount arrangement defined by the exterior surface of the enclosure and associated with a second side of the enclosure that extends in a crossing direction relative to the first side of the enclosure;
wherein each of the first mount arrangement and the second mount arrangement defines a channel that is defined by a wider end and a narrower end and that snap-fittingly cooperates with a first tang and a second tang associated with an accessory mount; and
wherein the accessory mount slidably cooperates with each of the first mount arrangement and the second mount arrangement.

2. The camera accessory system of claim 1 wherein the accessory mount further comprises at least one of a rare earth magnet and a threaded connection, wherein the at least one rare earth magnet and the threaded connection are constructed to cooperate with a support.

3. The camera accessory system of claim 1 wherein the accessory mount includes a first portion that removably cooperates with each of the first and second mount arrangements, a second portion that cooperates with a support and a multi-directional connection disposed between the first and second portions.

4. The camera accessory system of claim 3 wherein the multi-direction connection includes an index that provides an indication of an orientation of the first portion relative to the second portion.

5. The camera accessory system of claim 1 further comprising at least one of a tripod, a camera stand, a flash, a tether, and at least one of a level and a pitch indicator constructed to cooperate with the accessory mount.

6. The camera accessory system of claim 1 further comprising at least one shim constructed to cooperate with the enclosure to manipulate a volume of the cavity to generally correspond to a volume of a camera device disposed therein.

7. The camera accessory system of claim 1 further comprising a third mount arrangement defined by the exterior surface of the enclosure and associated with a third side of the enclosure, the third mount constructed to slidably cooperate with the accessory mount.

8. A method of forming a camera accessory system, the method comprising:
providing a base that removably cooperates with a camera device and which cooperate with the camera device without interfering with direct connect user interaction with a least one of a control associated with operation of the camera device such that the at least one control remains unobstructed when the camera device is engaged with the camera accessory system, the base including a plurality of mount arrangements formed on an exterior surface thereof and forming each mount arrangement as a tapered channel and such that at least two of the plurality of mount arrangement are oriented on different orthogonal side of the base; and providing a mount adapter that removably cooperates with each of the mount arrangements and that includes a pair of tangs that slidably cooperate with a respective tapered change when the mount adapter is engaged therewith.

9. The method of claim 8 further comprising forming a barb proximate an end of each of the pair of tangs.

10. The method of claim 8 further comprising providing each mount adapter with at least one of at least one magnet, a pivotable joint, a cavity, and a threaded connection.

11. The method of claim 10 further comprising providing at least one of a tripod, a support post, a magnetic mount, a flash, and a tether, that removably cooperates with the mount adapter.

12. The method of claim 8 further comprising providing a shim constructed to be captured between the camera device and the base.

\* \* \* \* \*